3,514,925
GAS CHROMATOGRAPHY COLUMN AND METHOD OF MAKING SAME

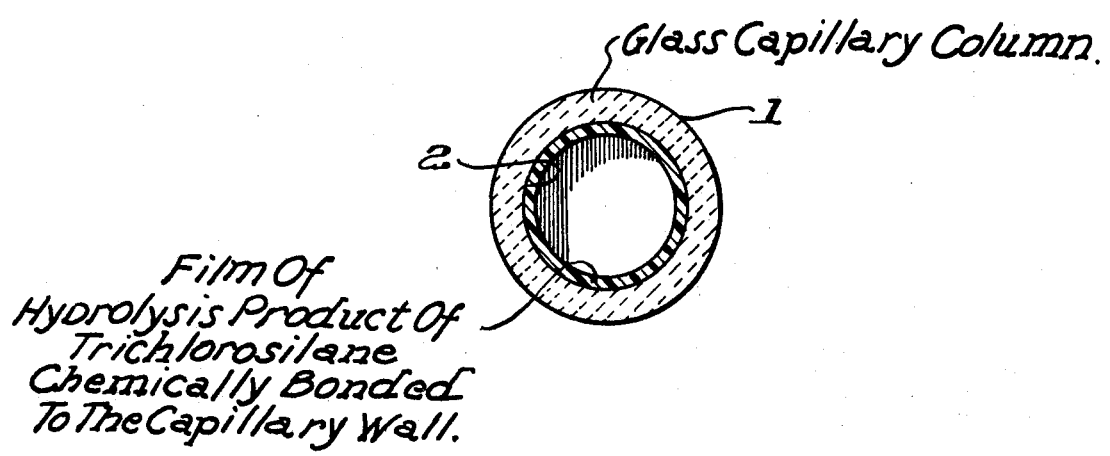

Clayton J. Bossart, Monroeville, Pa., assignor to Mine Safety Appliances Company, Pittsburgh, Pa., a corporation of Pennsylvania
Filed Sept. 5, 1967, Ser. No. 665,444
Int. Cl. B01d 15/08
U.S. Cl. 55—386      6 Claims

ABSTRACT OF THE DISCLOSURE

An open tubular chromatography column is prepared by applying an etching agent to the bore of a glass capillary tube, removing the etchant, then coating the bore with a hydrolyzable organosilane compound of the group di- and tri-halogenated organosilanes and di- and tri-alkoxyorganosilanes, hydrolyzing said compound and removing volatile hydrolysis products and water, the hydrolyzed organosilane portion of said compound reacting with the silicate surface of said bore to form a chromatographic film bonded to the bore surface. Tubes so prepared are used in the practice of gas chromatography.

BACKGROUND OF THE INVENTION

The invention relates to gas chromatography using the well-known open tubular columns, sometimes called Golay or capillary columns. Such columns have various advantages over conventional packed columns in terms of high resolution, high efficiency, small sample size, and the like. However, they are attended by certain disadvantages. For instance, the stability of the liquid phase with which the capillary bore is coated is dependent upon the surface tension or adhesive force between the liquid and the bore surface. Smooth wall surfaces, such as presented by glass do not normally provide a stable film as well as rough wall tubing, of which stainless steel is an example. In many cases the adhesive forces between the liquid coating and glass are not strong enough or uniform enough so that the liquid may distribute very nonuniformly down the length of the column, or may even accumulate in droplets. Glass capillary columns are much more subject to such factors than are metal columns.

Open tubular glass capillary columns do, however, possess some desirable features. The tube cost is much lower than that of stainless steel tubing. Glass is quite inert and generally provides a surface relatively free of catalyst and otherwise active sites which might cause peak tailing and/or sample degradation. Additionally, the transparency of glass facilitates visual inspection of the coating process and of the resultant coat. However, despite these advantages glass tubing has been used only to a limited extent because of the aforementioned liquid film problem.

SUMMARY OF THE INVENTION

The invention is summarized in the foregoing abstract.

It is among the objects of the invention to provide open column glass chromatography columns which combine the advantages of glass Golay columns and in the preparation and use of which the problems of glass tubes outlined above are minimized or largely obviated. More particularly, but not by way of restriction, other objects of the invention are to provide open column glass chromatographic tubes having the active chromatographic agent bonded to the column bore, and to provide such tubes having a wide range of such agents and of greater stability in use than has been possible with wall coated liquid agents, which tubes are applicable to a wider range of operating conditions than heretofore, and from which such contaminants as carbon and tars may be removed easily to condition the tubes for continued use. A further object is to accomplish these objects by a simple, easily performed, and effective procedure.

THE DRAWING

The invention will be described with reference to the accompanying drawing which is a cross-sectional view on a greatly enlarged scale of a glass open column capillary tube in accordance with the invention.

DESCRIPTION OF THE PREFERRED EMBODIMENT

In accordance with the invention the inside surface, or bore, of glass capillary tubing is treated with a reagent to etch its surface. This is accomplished suitably with an aqueous liquid reactant capable of increasing the number and size of the pores normally present in the tubing surface, or in the gas phase with $NH_3$ or $HF$. This may be done using the same type of apparatus and procedure normally used for coating open columns with liquid chromatography agents. The corrosion rate may be increased by the use of elevated temperatures as will be understood. At the end of this operation the tube is thoroughly flushed with distilled water to remove all traces of the etchant. The tubing should then be flushed with dry air at an elevated temperature to remove residual water and hydroxyl groups attached to the silicate surface.

As an example, there may typically be used glass tubing of $\frac{1}{16}$ inch O.D. by 0.020 inch I.D. although as will be understood in the art, these dimensions are not limiting but merely typical. Etching may be accomplished with a dilute solution of an alkali such as caustic soda or ammonium hydroxide, or hydrofluoric acid. After the tube has been flushed to remove all traces of the etchant it is flushed with dry air to accomplish the function just stated, suitably at 500° to 600° C.

The tube is now ready for coating in the manner normally applied with liquid chromatographic agents but in this case there is used a solution in a dry, inert volatile solvent of a di- or tri-organohalosilane or organoalkoxy-silane. Also applicable are silanes with di- and tri-substituted hydrolyzable organic radicals, i.e. to di- and tri-acyloxy organosilanes. For example, octadecyl triacetoxy silane $(C_{18}H_{37}Si—(OOCH_3)_3$ will hydrolyze on the glass surface with attachment to it of the octadecyl silanol radical and production of acetic acid as a by-product. Thus the invention is applicable generally to di- and tri-substituted hydrolyzable organosilanes.

After the bore of the tube has received a coating of the organosilane, the solvent is removed by flushing with a dry inert gas such as nitrogen or argon and the like. It is then ready for the chemical bonding reaction which is accomplished by flushing clean warm air saturated with water vapor through the column. The organohalosilane is hydrolyzed by the water vapor in the flushing gas with conversion of the organohalo portion of the silane to the corresponding silanol which being in a nascent condition reacts with the silicate surface of the bore to bond the organosilane radical to the bore through —O—Si—O—linkages. In this reaction halogen acid is released by the halogen, and the completion of the reaction is determined readily by testing with a reactant for the acid until the acid is no longer evolved. Thus in the case of chlorosilanes hydrolysis results in production of HCl and an organo silanol. Similarly, organoalkoxysilanes from silanols and alcohols.

For many purposes alkylchlorosilanes are preferred, and particularly organotrichlorosilanes which upon heating liberate, as indicated, hydrochloric acid. In the case of alkoxysilanes, typified by trimethoxyorganosilane hydrolysis is productive of methyl alcohol.

At the completion of the reaction the column is flushed with dry inert gas at an elevated temperature, suitably 50° to 100° C. to remove all traces of hydrolysis products. The column is then ready for use.

The result is a capillary tube having bonded to the bore surface product of the hydrolysis reaction. This bonding is believed to be due to reaction between the $SiO_2$ sites of the silicate surface and the silcol produced by hydrolysis or from condensation of the silicol to the corresponding siloxane with concurrent reaction with the $SiO_2$ sites of the bore surface. The net result is a film of the organosilicon hydrolysis product bonded to the glass surface of the tube through —OSi—O bonds.

A wide variety of di- and tri-organosilanes may be used in the practice of the invention including a variety of both halo- and alkoxyslanes. The following are representative:

EXAMPLES OF RADICALS

Alkyl:
  Methyl-
  Ethyl-
  Propyl-
  iso-Butyl-
  n-Butyl
Alkoxy:
  Butoxy-
  Allyloxy-
Alkene:
  Vinyl-
  Propenyl-
  Vinylacetylenyl-
Cycloalkyl:
  Cyclohexyl-
Aromatic:
  Phenyl-
  Tolyl-
Cyano alkyl:
  Cyanoethyl-
  Cyanobutyryl-
Amino:
  Tert.-butylamino Because the active chromatographic agent is now bonded to the surface of the tube bore its stability is greatly increased in comparison with tubes coated as in past practice by a liquid film supplying the active radical. An important feature of the invention is the ability to attach radical groups which as separate compounds are at least somewhat, and in some cases extremely, volatile so as to be non-usable for gas chromatography. For example, if it were attempted to coat a tube with normal hexane, it would quickly bleed off at ambient temperatures so that acceptable results would not be had using it as a chromatographic agent. However, an n-hexyl radical can be provided simply and easily through the practice of the invention by using an n-hexyl trichlorosilane, for example. In this instance the n-hexyl group produced upon hydrolysis in accordance with the invention becomes bonded to the silicate surface to provide a highly stable film so that the column is capable of use from Dry Ice temperatures to temperatures at which the C—Si bond becomes broken, say 300° C.

A further advantage of the tubes provided by the present invention arises from the fact that with customary liquid coated tubes the liquid coating may, as indicated above, become nonuniform over the length of the tube and may even be stripped away by an overload of test sample, thus exposing bare, uncoated and possibly catalytic sites of the inner bore at the flow inlet end of the column to future samples or the liquid may accumulate toward the front end of the tube thus exposing inactive portions to further samples toward the front end of the tube. This does not happen with the chemically bonded films of this invention. Furthermore, due to the bonding of the film it will usually be possible to remove accumulated residues of carbon and tars from the columns by the use of inert liquid solvents thus conditioning the tubes for continued use.

The invention is also applicable to another type of open tubular column which is termed "support coated open tubular column." In this case the outer wall of the tubing is usually metal (e.g., copper, cupro-nickel or stainless steel). However, the inner wall of the metal tubing which is exposed to the sample and carrier gases comprises a layer of ultra-fine particles of glass support, for example, diatomaceou earth, in low micron and submicron sizes. It is this layer which retains the chromatographic phase. In practice these columns are prepared by solution coating. A solution of the desired liquid phase and solvent containing suspended particles of the support is flushed through the metal tubing. As the solution reservoir is depleted, some of the particles containing impregnated liquid phase are left on the inner wall of the tubing. Flushing with inert gas removes residual solvent. This same technique could be used to provide a layer of support material impregnated with the hydrolyzable organosilanes of this invention. Warm, wet air would then be used to bond the organosilane to the support.

I claim:
1. The method of preparing a chromatography column comprising providing a glass capillary tube, passing through the bore of said tube a current of dry inert gas at a temperature to eliminate water and hydroxyl groups attached to the surface of said bore, coating the bore of the tube with a hydrolyzable organosilicon compound selected from the group consisting of di- and trihalogenated organosilanes, di- and trialkoxyorganosilanes, di- and triacyloxyorganosilanes, and passing through the bore a current of inert gas saturated with water vapor to hydrolyze said compound with bonding of the residual hydrolysis product to said bore and thereby providing an active chromatographic film consisting essentially of said product.

2. The method of making a chromatography column comprising etching the bore of a glass capillary tube with an aqueous etchant, flushing away residual etchant, then passing dry inert gas at a temperature to remove water and hydroxyl groups attached to the surface of the bore, then coating the bore with a solution in an inert solvent of hydrolyzable organosilicon compound selected from the group consisting of di- and trihalogenated organosilanes, di- and trialkoxyorganosilanes, di- and triacyloxyorganosilanes, then passing a current of inert gas saturated with water vapor to hydrolyze said compound, and then passing heated dry gas through the bore to remove residual volatile hydrolysis products and water and thereby bonding the hydrolysis product of said compound to the bore to provide an active chromatographic agent consisting essentially of said product.

3. A method according to claim 2, said heated gas being air at a temperature of about 50° to 100° C.

4. As a new article of manufacture, a glass capillary chromatography tube the open bore of which has bonded to its surface a chromatographic film consisting essentially of the reaction product of the silicate surface of the tube and the organosilicon residue of hydrolysis of a hydrolyzable organosilicon compound selected from the group consisting of di- and trihalogenated organosilanes, di- and trialkoxyorganosilanes, di- and triacyloxyorganosilanes.

5. A glass chromatography tube having on its open bore a chromatographic film consisting essentially of the organosilicon radical of a hydrolyzable organosilicon compound selected from the group consisting of di- and trihalogenated organosilanes, di- and trialkoxyorganosilanes, di- and triacyloxyorganosilanes bonded to the surface of said bore through —Si—O—Si bonds.

6. An open bore chromatography tube whose inner surface consists of granular particles of glass support bonded to a chromatographic film consisting esentially of the organosilicon radical of a hydrolyzable organosilicon compound selected from the group consisting of di- and trihalogenated organosilanes, di- and trialkoxyorganosilanes, di- and triacyloxyorganosilanes.

References Cited

UNITED STATES PATENTS 3,116,161   12/1963   Purnell _____ 55—386 X

OTHER REFERENCES

Gas Chromatography Abstracts, 1963, No. 930, page 174.

Pollard et al., New Gas Liquid Chromatographic Phase, Journal of Chromatography, 22 (1966) 23–28.

JAMES L. DECESARE, Primary Examiner